J. M. WAUGH.
SPRING DRIVING GEAR.
APPLICATION FILED JAN. 2, 1915.
1,222,699.
Patented Apr. 17, 1917.
2 SHEETS—SHEET 1.
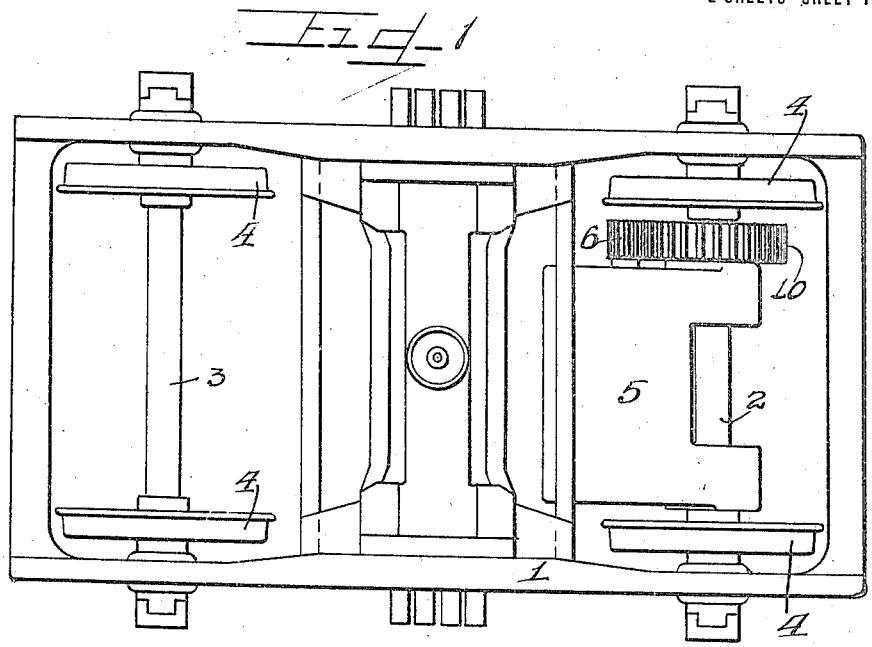
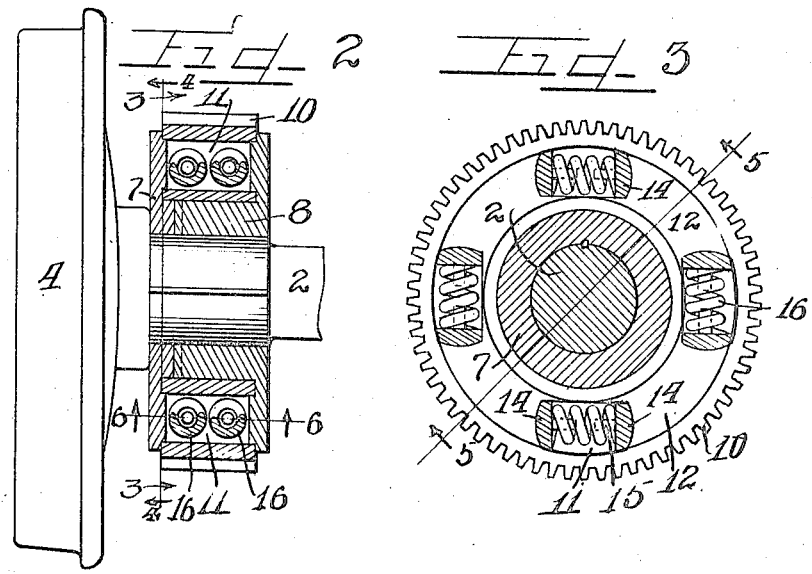
Witnesses
J. W. Angell
Charles T. Hollop
Inventor
James Milton Waugh
by Charles W. Nicow
Atty.

J. M. WAUGH.
SPRING DRIVING GEAR.
APPLICATION FILED JAN. 2, 1915.
1,222,699.
Patented Apr. 17, 1917.
2 SHEETS—SHEET 2.
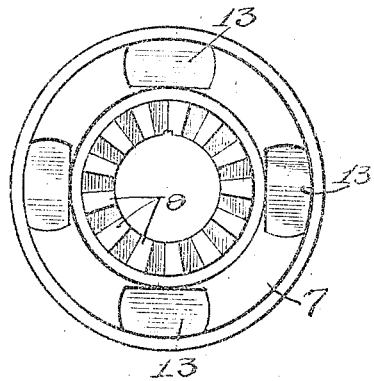
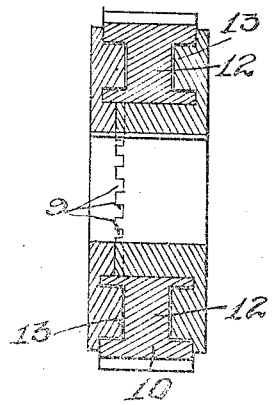
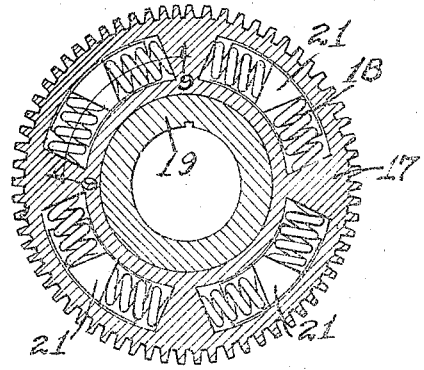
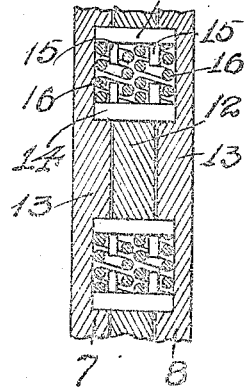
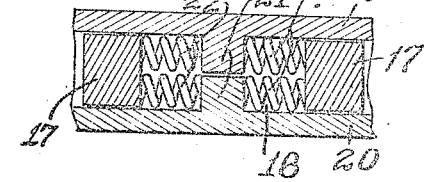
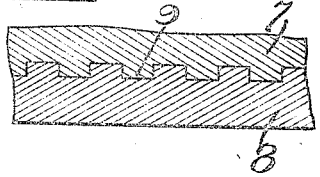

UNITED STATES PATENT OFFICE.

JAMES MILTON WAUGH, OF CHICAGO, ILLINOIS.

SPRING DRIVING-GEAR.

1,222,699.     Specification of Letters Patent.     Patented Apr. 17, 1917.

Application filed January 2, 1915. Serial No. 65.

*To all whom it may concern:*

Be it known that I, JAMES MILTON WAUGH, a citizen of the United States, and a resident of the city of Chicago, in the county of Cook and State of Illinois, have invented certain new and useful Improvements in Spring Driving-Gears; and I do hereby declare that the following is a full, clear, and exact description of the same, reference being had to the accompanying drawings, and to the numerals of reference marked thereon, which form a part of this specification.

It is a well known fact that the power required to initially set machinery in motion is greater than that required to maintain the same running. Owing to this feature electric drives have been more or less objectionable, owing to the heavy starting torque required, thus necessitating an excessive overload current momentarily for the purpose.

This invention relates to an improved means for transmitting the drive from a power element to the driven mechanism, whereby the power element is permitted a slight relative movement due to the compression of springs in starting or when an overload occurs, so that a sudden application of a heavy overload upon the power element is avoided.

It is an object of this invention to construct a driving gear consisting of relatively movable parts having resilient members interposed therebetween for the transmission of power.

It is furthermore an important object of this invention to construct a driving mechanism embracing an annular gear relatively movable upon a fixed hub or shaft member with springs connected therebetween to transmit power from the gear to the said member.

It is finally an object of this invention to provide a construction simple in design and operation well adapted for use in the transmission of power to relieve the power element of heavy starting loads.

The invention (in a preferred form) is illustrated in the drawings, and more fully pointed out and defined in the appended claims.

In the drawings:

Figure 1 is a top plan view of an electric car truck equipped with a device embodying the principles of my invention.

Fig. 2 is a detail view illustrating a car wheel in elevation with a driving gear embodying the principles of my invention, shown in section mounted on the axle for the car wheel.

Fig. 3 is a detail section taken on line 3—3 of Fig. 2, with parts in elevation.

Fig. 4 is a detail view taken on line 4—4 of Fig. 2, showing the interior face of one of the sections of the hub member.

Fig. 5 is a section taken on line 5—5 of Fig. 3.

Fig. 6 is a detail section taken on line 6—6 of Fig. 2.

Fig. 7 is a sectional detail view illustrating the means of connecting the respective hub sections one to another.

Fig. 8 is a central vertical section taken through a modified form of device.

Fig. 9 is a detail section taken on line 9—9 of Fig. 8.

As shown in the drawings:

The reference numeral 1, indicates as a whole a car truck having axles 2 and 3, respectively, journaled therein with wheels 4, secured thereon in a usual manner. An electric motor 5, is mounted near one end of said truck in a position to drive the axle 2, and for this purpose said motor is provided with a driving pinion 6. In order to transmit the drive from the pinion 6, to the axle 2, a driving gear embodying the principles of my invention is mounted upon said axle, and comprises hub members 7 and 8, respectively, or which may be termed a cover plate and center or hub member respectively, each of which is radially notched complementally with the other to interfit in locked relation as clearly shown in Figs. 4 and 7, and denoted by the reference numeral 9.

Journaled on and between said respective hub members 7 and 8, is a gear 10, which is provided with a plurality of recesses 11, extending entirely therethrough from face to face of the gear at various points circumferentially therearound. As clearly shown in Figs. 5 and 6, said gear 10, is provided with a web portion 12, between the respective recesses therein, which is of less width than the width of the gear face of the gear, and each of the respective hub members 7 and 8, are provided with abutments or projections 13, thereon, which fit into the groove thus afforded on each side of the gear.

Placed within, and at the ends of the recesses 10, of the gear, are follower blocks 14, flat on their inner surfaces and provided with a pair of central short studs 15, and on their outer surfaces rounded or convex, as clearly shown in Fig. 3. Disposed between each pair of follower blocks 14, within each of the recesses of the gear, are a pair of coiled compression springs 16, which, at their ends, engage over the stud members 15, of the follower blocks and are thus held properly spaced in operative position. As clearly shown in Figs. 2 and 6, said follower blocks 14, are of a length to extend or project beyond the web 12, of the gear and bear against the abutments 13, on the respective hub members. Said hub members 7 and 8, may be positively secured one to another in any suitable manner, such as by bolts extending therethrough, although in the construction shown no such means is provided, the members being rigidly secured upon the axle 2, independently of one another and yet in interfitting relation.

In the modification illustrated in Figs. 8 and 9, I have shown a gear 17, provided with a plurality of arc shaped recesses 18, circumferentially therearound, said gear being journaled, as before, upon complemental hub members 19 and 20, which fit flat against the gear on each side thereof. Said hub members are each provided with projections or abutments 21, on the inner surfaces thereof, which extend into said recesses 18, of the gear, substantially at the middle thereof, and disposed within each of said recesses on each side of said respective abutments 21, are pairs of spiral compression springs 22, as clearly shown in Fig. 9.

The operation is as follows:

The gear, of course, is driven directly by the pinion 6, of the motor, but an immediate positive drive is not transmitted to the axle 2, thereby imposing a heavy initial starting load upon the motor, but the gear moves slightly, thus compressing the springs contained therewithin, and after compression thereof transmitting the stress to the respective hub members on which it is journaled, and thence to the axle 2. Of course, after the axle 2, has been set in motion the springs expand again into normal position, thus imparting an additional thrust to the hub members and accelerating the rotation of the axle during such time as the extension of the springs takes place, and then the entire driving gear operates as a unitary element. This is due to the fact that the springs are of extremely heavy construction, and under slight loads are not appreciably compressed, being only stressed when excessive or abnormal loads are imposed upon the mechanism.

The mechanism operates admirably to take up uneven applications of power or load, as the case may be, so that the objectionable knocking and other vibrational features of an ordinary positively acting mechanism when subjected to severe conditions of driving, are obviated entirely.

Of course, I am aware that various details may be varied through a wide range, and I therefore do not purpose limiting the patent granted, otherwise than necessitated by the prior art.

I claim as my invention:

1. In a device of the class described the combination of hub and cover plate members, and a gear journaled therearound, springs disposed in recesses in said gear, abutments at each end of said springs adapted to rest against said gear, and abutments on said hub members adapted to receive stress through said springs and first mentioned abutments, from the gear to cause simultaneous rotation of said gear and hub members.

2. In a device of the class described interfitting hub members, a gear journaled on and disposed therebetween, springs disposed in recesses provided in said gear, follower blocks in the ends of said recesses and extending beyond the side walls of the gear and abutments formed on said hub members to contact said follower blocks to effect driving engagement between said gear and hub members through said springs.

3. In a device of the class described a gear having a plurality of recesses therein, springs disposed in said recesses, follower blocks disposed at each end of said recesses, means thereon to hold said springs engaged thereagainst in proper position, and mechanism on which said gear is journaled adapted to receive a drive therefrom through said springs, by contact with said follower blocks.

4. In a device of the class described interfitting hub members, abutments on the inner surfaces of each thereof, a gear journaled on said hub members and disposed therebetween, said gear having a plurality of recesses circumferentially therearound, groups of spiral compression springs mounted within said recesses, and follower blocks within said recesses projecting beyond the side walls of the gear and contacting said abutment members to effect a drive from said gear through said springs to the hub members.

5. In a driving mechanism of the class described a gear having a plurality of recesses therein, coiled springs disposed within said recesses, follower blocks at each end of the recesses slidable therein, projections on said blocks adapted to engage said springs to hold the same properly spaced within the recesses, and mechanism adapted to contact said follower blocks to effect driving engagement between said mechanism and said gear.

6. In a device of the class described, a hub or center member, a cover plate for attachment thereto, a gear journaled around said hub and cover plate members, the web of said gear interposed therebetween, said web having recesses therein, springs disposed in said recesses, follower blocks at the ends of the springs in each of said recesses, said hub member constructed to contact said follower blocks whereby a drive is transmitted from the gear through said springs to said hub member.

7. In a device of the class described, a gear, a web integral therewith having recesses therein, springs disposed in said recesses, abutments mounted in said recesses against which the end of said springs bear, and hub and cover plate members, one on each side of the web of said gear and on which said gear is journaled and constructed to contact said abutments whereby the drive received by the gear is transmitted through said springs to said hub and cover plate members.

8. In a device of the class described, hub members, a gear journaled thereon and therebetween, said gear having a plurality of recesses circumferentially therearound, groups of coiled springs mounted within said recesses, follower blocks within said recesses at the ends of said springs, and said hub members constructed to bear against said follower blocks whereby the drive is transmitted from the gear through said springs and follower blocks to said hub members.

In testimony whereof I have hereunto subscribed my name in the presence of two subscribing witnesses.

JAMES MILTON WAUGH.

Witnesses:
 CHARLES W. HILLS, Jr.,
 FRANK K. HUDSON.